United States Patent [19]

Allen et al.

[11] 4,118,782
[45] Oct. 3, 1978

[54] DIGITAL SOUND VELOCITY CALCULATOR

[75] Inventors: Royce H. Allen, Centerville, Utah; Jerry L. Sutton; Dan M. Griffin; Hal W. Frye; Joseph G. Colborn, all of San Diego, Calif.

[73] Assignee: The United States of America as represented by the Secretary of the Navy, Washington, D.C.

[21] Appl. No.: 780,750

[22] Filed: Mar. 24, 1977

[51] Int. Cl.$^2$ .......................... G01H 5/00; G01P 3/00
[52] U.S. Cl. ...................... 364/565; 73/645; 364/423; 364/580; 364/516
[58] Field of Search ................. 235/151.3; 73/560, 69, 73/70; 340/3 R, 3 E, 4 R, 55; 181/0.5, 110, 120; 33/126; 364/516-518, 565, 580, 423

[56] References Cited

U.S. PATENT DOCUMENTS

| | | | |
|---|---|---|---|
| 2,758,663 | 8/1956 | Snavely | 73/560 |
| 3,441,901 | 4/1969 | Cawley et al. | 73/560 |

OTHER PUBLICATIONS

Wilson, W. D., "Equation for the Speed of Sound in Sea Water", J. Acoust. Soc. Am., vol. 32, No. 10, p. 1357; Oct. 1960.
Wilson, W. D.; "Speed of Sound in Sea Water as a Function of Temperature, Pressure, and Salinity", J. Acoust. Soc. Am., vol. 32, No. 6, pp. 641-644, Jun. 1960.
Brown, R. K., "Measurement of the Velocity of Sound in the Ocean", J. Acoust. Soc. Am., vol. 26, No. 1, pp. 64-67, Jan. 1954.
Stephenson, E. B., "Velocity of Sound in Sea Water", The Physical Review, S.S. vol. 21, No. 2, Feb. 1923.
Mackenzie, K. V., A Decade of Experience with Velocimeters, J. Acoust. Soc. Am., vol. 50, No. 5, pp. 1321-1333, Mar. 1971.
Lacy, L. L. et al., "Measurements of Ultrasonic Velocities using a Digital Averaging Technique", J. Acoust. Soc. Am., vol. 52, No. 1 (Part 2) Jul. 1972, pp. 189-195.
Holbrook, G. W. et al., "A High Sensitivity Underwater Sound Velocity Meter", Dig. of Tech. Papers of 1970, IEEE Conf. on Eng. In Ocean Environ.", Sep. 1970, pp. 14-16.
Wilson, W. D., "Extrapulation of the Equation for the Speed of Sound in Sea Water", J. Acoust. Soc. Am., vol. 34, No. 6, p. 866, Jun. 1962.

*Primary Examiner*—Malcolm A. Morrison
*Assistant Examiner*—Errol A. Krass
*Attorney, Agent, or Firm*—Richard S. Sciascia; Ervin F. Johnston; James O. Skarsten

[57] ABSTRACT

A digital apparatus for determining the velocity of sound at a selected position in a liquid media is provided with a means for representing the conductivity, temperature and depth of the position in the form of digital numbers, and provides a digital calculating means receiving each of the digital numbers for calculating the velocity of sound as a function of conductivity, temperature, and depth. The sound velocity may be calculated at a succession of positions to provide sound velocity versus depth profile of the liquid media.

7 Claims, 5 Drawing Figures

DSVC BLOCK DIAGRAM

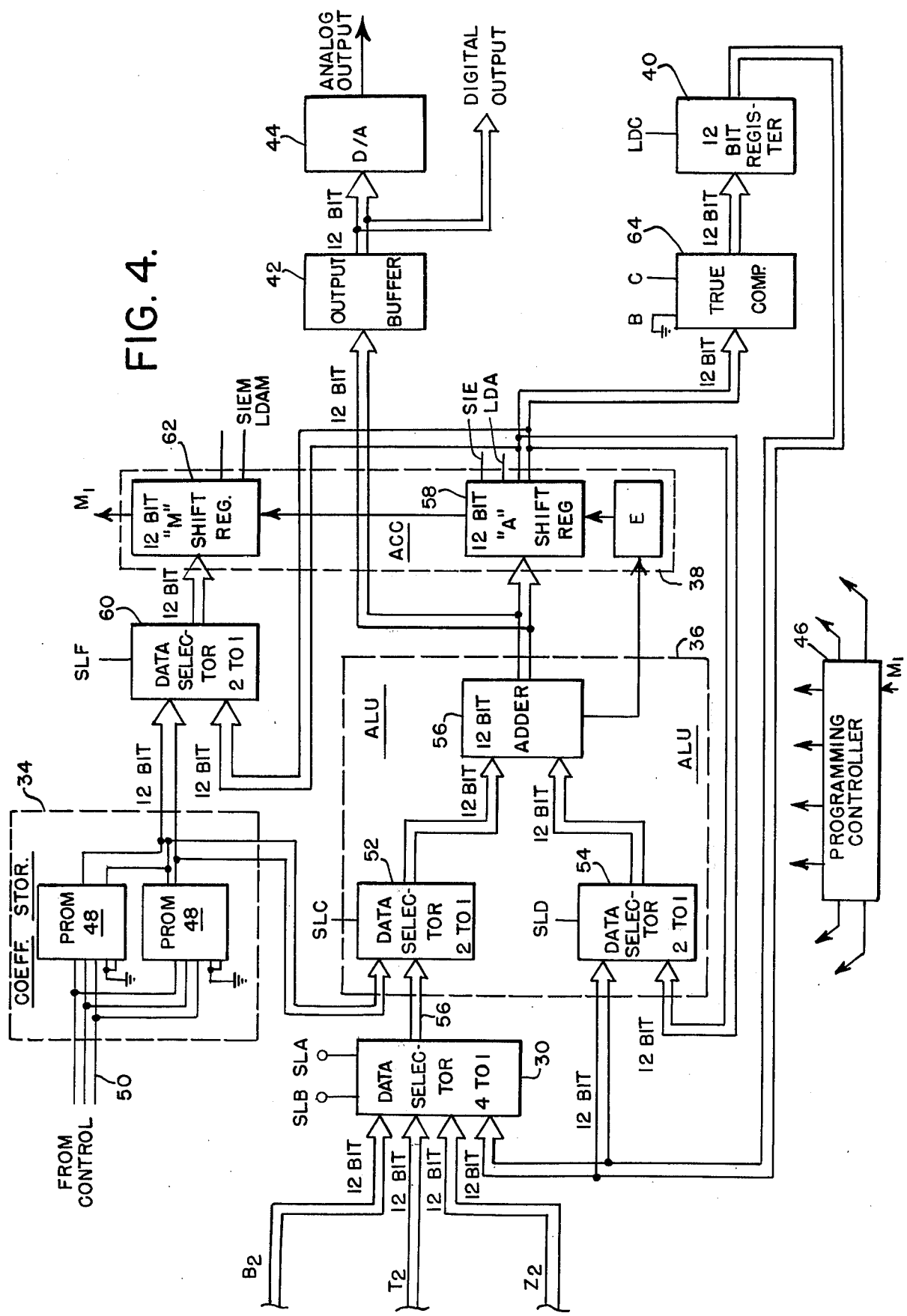

DIGITAL SOUND VELOCITY CALCULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein pertains generally to an apparatus for calculating the velocity of sound in a liquid media, and more particularly pertains to such apparatus wherein digital means are employed to calculate sound velocity as a function of conductivity, temperature, and depth.

To effectively employ sonar equipments, as well as to accomplish numerous other activities involving acoustic transmissions in seawater, it is very important to determine the velocity of sound in seawater. A most useful form for such information is a real-time profile of sound velocity versus depth, which may indicate, for example, the refractive effects on sonar waves of different layers of seawater, or the flow of currents through the different layers. As is well known, the velocity of sound at a selected position in seawater is affected by both the temperature and the salinity thereof.

In the past, temperature probes or other thermometric devices have been employed to provide a sound velocity profile by measuring the temperature at various depths in an ocean body. More recently, probes have been used which provide salinity as well as temperature data. Obtaining a profile from such data, however, may require reference to tables and time-consuming computations, whereby the profile is not in real time.

In other types of prior art devices, sound velocity in an ocean media may be directly measured by immersing an active signal producing device in the media, the device radiating signals which are functionally related to the sound velocity at positions through which it passes. In addition to possible errors due to Doppler shift, such active systems may be unsuitable for military purposes where the radiated signals are subject to detection by an unfriendly observer.

SUMMARY OF THE INVENTION

The present invention discloses an apparatus for determining the velocity of sound at a selected position in a liquid media, such as an ocean body, wherein means are provided for representing variables comprising the conductivity, temperature and depth of the selected position in the form of digital numbers, the conductivity of a given position being proportional to the salinity thereof. The invention further provides digital calculating means which receives each of the variables in their respective digital forms and calculates the velocity at the selected position as a function of the conductivity, temperature and depth thereof. In some embodiments of the invention a data processing means may be employed which is adapted to be operable under the control of alternative programs, each program representing an alternative function of the conductivity, temperature, and depth which may be employed to calculate the velocity. Other embodiments of the invention may provide a real-time profile of sea water to a depth of 750 meters in less than two minutes. However, reference to any such embodiments is by no means intended to limit the scope of the invention herein disclosed.

OBJECTS OF THE INVENTION

An object of the present invention is to provide a new and improved digital apparatus for calculating the velocity of sound of selected positions in a body of sea water or other liquid media.

Another object of the invention is to provide a real-time profile of sound velocity versus depth for a body of sea water or other liquid media wherein accuracy may be substantially improved.

Another object of the invention is to provide a new and improved apparatus for calculating the real-time velocity of sound at a succession of positions in a liquid media as a function of the conductivity, temperature, and depth thereof.

These and other objects of the invention will become more readily apparent from the ensuing specification when taken together with the drawings.

BRIEF DESCRIPTION OF THE DRAWINGS

FIG. 4 is a more detailed block diagram of the calculator of FIG. 3.

DESCRIPTION OF THE PREFERRED EMBODIMENTS

Figure 1:
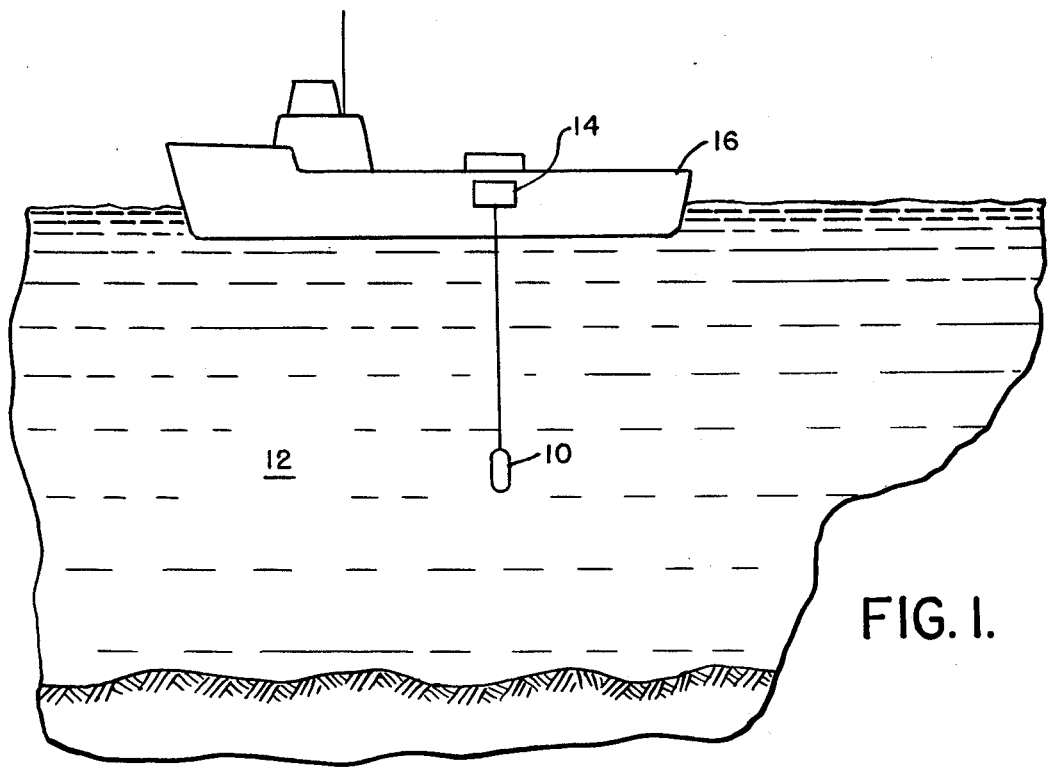
FIG. 1 is a perspective view showing a manner in which an embodiment of the invention may be usefully employed.

Referring to FIG. 1 there is shown a sensor 10 dropping at a constant rate through a liquid media 12, comprising an ocean body, which senses and couples conductivity, temperature and depth information to digital calculation-record system 14 aboard vessel 16 through a two conductor wire. To provide a real-time profile of sound velocity of media 12, system 14 determines and records the sound velocity at a succession of positions through which sensor 10 passes in its descent, sound velocity being calculated every 84 miliseconds. It may be noted that successive calculations of sound velocity are entirely passive i.e., it is unnecessary to radiate signals outward from sensor 10 or vessel 16. Also, calculations account for salinity of media 12 as well as the temperature thereof, conductivity being functionally related to salinity.

Figure 2:
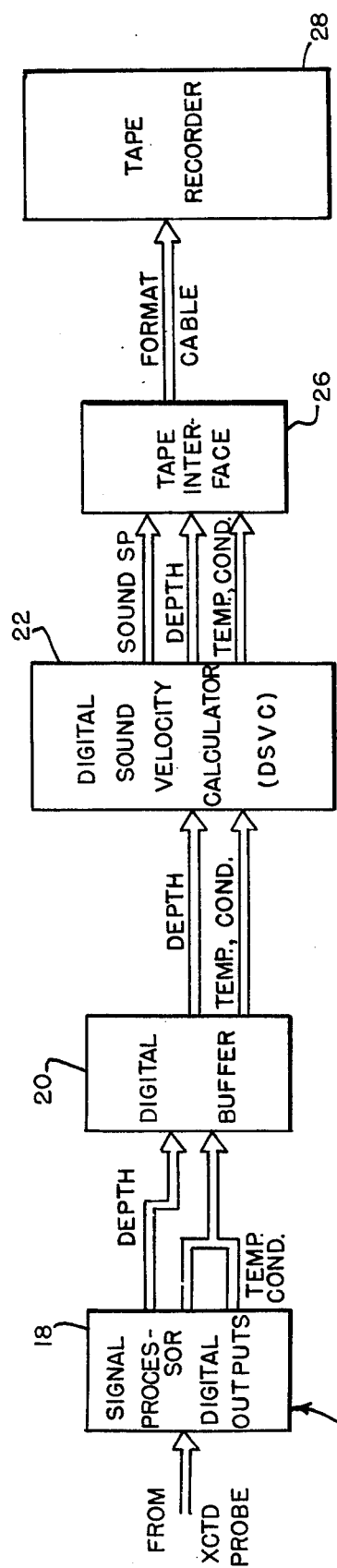
FIG. 2 is a block diagram showing a calculation-record system according to an embodiment of the invention.

Referring to FIG. 2 there is shown calculation-record system 14 wherein signal processor 18 receives successive values of the variables conductivity, temperature, and depth from sensor 10 in either analog or digital form, processor 18 representing each variable in digital form, encoded as a 12 bit binary number. Sensor 10 may be an XCTD (expendable conductivity temperature depth) probe, which together with processor 18 comprises a standard sensor-processor system, such as that built by Plessy Environmental Systems.

The digital-form variables are coupled from processor 18 to a digital buffer 20, which may be of any standard design to prevent loading of the processor system. From buffer 20 the variables are coupled to digital sound velocity calculator (DSVC) 22, a digital device structured to calculate sound velocity of media 12 as a selected function of conductivity, temperature and depth. DSVC 22 provides a first output signal wherein velocity is represented in analog form, and also a second output signal wherein velocity is represented in digital form, encoded as a 12 bit binary number. The analog output is coupled to a strip chart recorder 24 to provide a graphic representation of sound speed versus depth in real time, and the digital output, along with the variables in their respective digital forms, are coupled through a suitable tape interface 26 and a format cable to a digital tape recorder 28.

Figure 3:
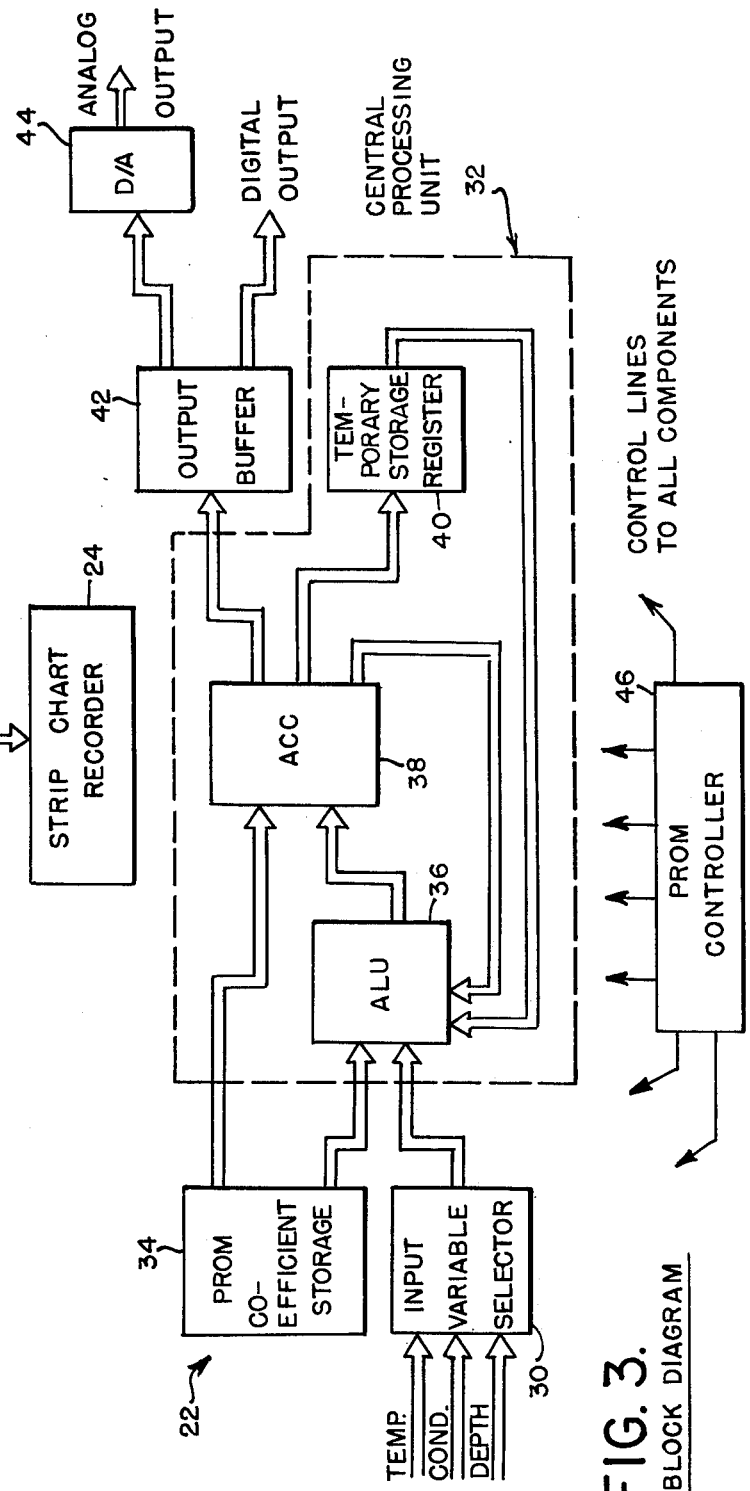
FIG. 3 is a block diagram showing a digital sound speed calculator according to an embodiment of the invention.

Referring to FIG. 3 there is shown DSVC 22 comprising a data processing means wherein variable selector 30 receives the aforementioned variables from digital buffer 20 and couple them into a central processing unit (CPU) 32. CPU 32 employs each variable together with coefficients stored in coefficient storage 34, to perform a series of arithmetic operations comprising binary addition, performed by arithmetic logic unit (ALU) 36, and binary multiplications performed by accumulator 38 in cooperation with ALU 36. The calculations of intermediate operations of a given series may be stored in temporary storage register 40, and the result of the final operation of a series comprises the sound velocity of a selected position in media 12 in its binary form, the velocity being coupled through output buffer 42 to digital tape recorder 28 and also to digital-analog (D/A) converter 44, which provides the velocity in analog form.

Referring further to FIG. 3 there is shown programmable controller 46 which couples control signals to each of the aforementioned components of DSVC 22 to control the operation thereof in calculating sound velocity. It will be readily apparent that the operation of DSVC 22 is dependent upon the function of the variables conductivity, temperature and depth which is selected to calculate sound velocity.

If C is sound velocity in meters/second at a selected position in media 12, B is the conductivity of the position in millimhos, T the temperature in degrees centigrade, and Z the depth in meters either of the following emperically derived functions may be employed to calculate C:

$$C = 1.68533B - 0.0334_6 BT + 3.95866T - 0.01507T^2 + 0.01596Z + 1400.631 \quad \text{Eq. 1}$$

$$C = 1.93074B - 0.06707BT + 0.0003886B^2T - 0.00004876B^3 + 4.69804T - 0.013437T^2 + 0.015954Z + 1394.486 \quad \text{Eq. 2}$$

It will be noted that Equation 1 has a quadratic form and Equation 2 has a cubic form, Equations 1 and 2 being valid over the following ranges:

25 mmhos < B < 65 mmhos

−2° C. < T < 35° C.

0 meters < Z < 750 meters

It is anticipated that one skilled in the art could derive other relationships which may also be employed to calculate sound velocity as a function of conductivity, temperature and depth.

To convert Equation 1 or Equation 2 into a binary form, enabling calculations by digital means, the following conversion equivalences may be employed:

$$B = \left(\frac{B_2}{4095}\right)^2 65$$

$$T = \left[\frac{T_2}{4095}(37)\right] - 2$$

$$Z = \frac{Z_2}{4095}(750)$$

where $B_2$ is a 12 bit binary number, $B_2$ proportional to the square root of B, $B_2$ range is from 2540 to 4095 which is proportional to 25 mmhos to 65 mmhos respectively;

$T_2$ is a 12 bit binary number, $T_2$ proportional to T, $T_2$ range is from 0 to 4095;

$Z_2$ is a 12 bit binary number $Z_2$ proportional to Z, $Z_2$ range is from 0 to 4095.

If $C_2$ is a 12 bit binary number and is the digital equivalent of sound velocity C over the aforementioned ranges of B, T, and Z, the above conversion equivalences may be applied to Equation 2 to show $C_2$ as a function of $B_2$, $T_2$ and $Z_2$:

$$C_2 = \frac{3190}{2048}\left\{\frac{-T_2}{4096}\left[\frac{1202T_2}{4096} + \frac{2892B_2^2}{(4096)}\right] + \frac{3687T_2}{4096} + \frac{233 Z_2}{4096} + \frac{B_2}{(4096)} 2\left[2418 + \frac{1316T_2^2}{(4096)}\right] - 930\right\} \quad \text{Eq. 3}$$

It may be noted that by employing Equation 3, $C_2$ could be calculated for specified values of $B_2$, $T_2$ and $Z_2$ by a series of binary multiplications, wherein variables are multipled by selected coefficients to provide a plurality of terms, and of binary additions, wherein the terms are added together. It may be further noted that $C_2$ could be represented by an alternative function of $B_2$, $T_2$ and $Z_2$ by applying the above conversion equivalences to Equation 1. It is anticipated that one skilled in the art could represent $C_2$ as other functions of $B_2$, $T_2$ and $Z_2$ which could likewise be calculated by a series of binary multiplications and additions.

Referring to FIG. 4, there is shown input variable selector 30 comprising a 4 to 1 data selector which may be a standard integrated circuit element, having its SLA and SLB terminals coupled to controller 46 and responsive to control signals therefrom to switch one of its four inputs to its output. The inputs to variable selector 30 comprise $B_2$, $T_2$, and $Z_2$ respectively, and also the output of temporary storage register 40, comprising a 12 bit register having its LDC terminal coupled to controller 46. FIG. 4 also shows coefficient storage 34 comprising interconnected programmable read-only memories 48, each of which may be an integrated circuit element and which are addressed by controller 46 through address line 50. Coefficient storage 34 stores coefficients required in the calculation of sound velocity by means of Equation 3, although other coefficients could be stored therein to calculate sound velocity by means of other functions.

Referring further to FIG. 4, there is shown ALU 36 substantially comprising 2 to 1 data selectors 52 and 54 and 12 bit adder 56, each of which may be an integrated circuit element. The SLC terminal of selector 52 is connected to controller 46, and receives control signals therefrom to selectively couple the output of selector 30 and storage 34 to adder 56. Similarly, the SLD terminal of selector 54 is connected to controller 46 to selectively couple the outputs of storage register 40 and of "A" shift register 58 to adder 56. The SLF terminal of 2 to 1 data selector 60 is connected to controller 46 to selectively couple the output of storage 34 and of "A" shift register 58 into "M" shift register 62.

"A" shift register 58 and "M" shift register 62 have 12 bit capacities, may be integrated circuit elements, and are interconnected to substantially comprise accumulator 38. Accumulator 38 cooperates with the components of ALU 36 to determine the product of a multiplicand, initially coupled through adder 56 into "A" register 58, and a multiplier, initially coupled through selector 60 into "M" register 62. Controller 46 is structured to successively receive the bits of the multiplier through terminal $m_1$ starting with the least significant bit, and to perform the multiplication by a well-known process of cumulative addition, wherein a succession of numbers is formed, each by shifting the multiplicand by $n$ places, and each of which is included in the addition if and only if the $n$th bit of the multiplier is logic 1.

As the multiplication proceeds, a succession of bits is coupled from "A" register 58 into "M" register 62 whereby the most significant 12 bits of the calculated product comprise the final output of "A" register 58, and the 12 least significant bits of the product comprise the final output of "M" register 62. Consequently, at the conclusion of the multiplication the output of "A" register 58 comprises a very close approximation to the product. It may be noted that the SIE and LDA terminals of "A" register 58 and the SIEM and LDAM terminals of "M" register 62 are connected to controller 46 and control signals coupled therethrough.

FIG. 4 shows the output of "A" register 58 coupled to temporary storage register 40 through true/complementary element 64, which has its "C" terminal coupled to controller 46, and which is provided to enable DSVC 22 to subtract a binary number by adding the complement thereof. Output buffer 42 comprises a 12 bit register, which may be an integrated circuit element, provided to prevent the output of adder 56 from being coupled out of DSVC 22 until adder 56 performs the final operation of the aforementioned series of operations.

Figure 5:
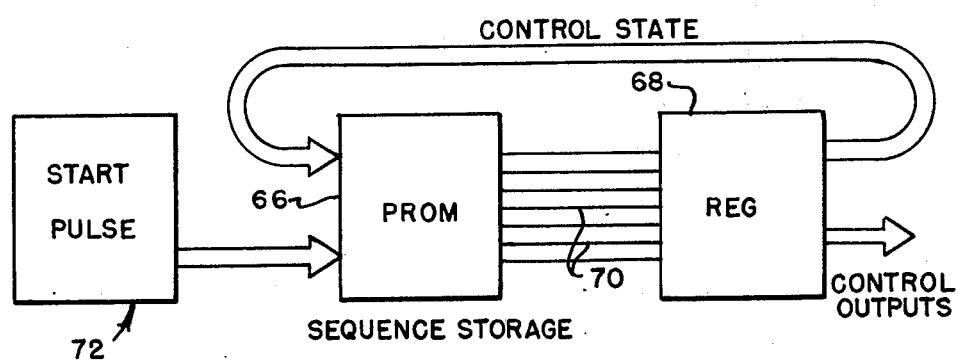
FIG. 5 is a block diagram of a programmable controller for the calculator shown in FIG's 3 and 4.

Referring to FIG. 5 there is shown programmable controller 46 substantially comprising a sequence storage 66, which may be configured from one or more programmable read-only memories, and a register 68 cooperatively interconnected therewith through lines 70. The outputs of register 68 comprise the aforementioned control signals for the operation of the DSVC. Sequence storage 66 is provided with a sequence of routines determined by the function employed to calculate sound velocity from the variables conductivity temperature and depth, and each time a start pulse is coupled to storage 66 from a source 72, controller 46 commences the sequence, the result of the final routine comprising the sound velocity of a selected position of media 12.

To calculate sound velocity $C_2$ according to Equation 3, the following sequence of routines may be employed:

0 — 2892→M Select $B_2$
1 — (M)($B_2$)→AM
2 — A→M
3 — (M)($B_2$)→AM
4 — A→C; 1202→M; Select $T_2$
5 — (M)($T_2$)→AM
6 — A+C→A Select C
7 — A→M; Select $T_2$
8 — (M)($T_2$)→AM Set Comp
9 — A→C; 1316→M
10 — (M)($T_2$)→AM
11 — A→M
12 — (M)($T_2$)→AM
13 — 2418+A→A
14 — A→M; Select $B_2$
15 — (M)($B_2$)→AM
16 — A→M
17 — (M)($B_2$)→AM
18 — A+C→A
19 — A→C; 3687→M; Select $T_2$
20 — (M)($T_2$)→AM
21 — A+C→A
22 — A→C; 233→M; Select $Z_2$
23 — (M)($Z_2$)→AM
24 — A+C→A
25 — A+C→A
26 — A+(−930)→A
27 — A→C; 3190→M; Select C
28 — (M)(C)→AM
29 — A→Output During routine 0, the coefficient 2892 is coupled into "M" register 62 from storage 34, and the value of $B_2$ for a selected position is coupled by variable selector 30 through adder 56 into "A" register 58.

During routine 1, the contents of the "A" and "M" registers are multiplied, whereupon AM, the combined outputs of the "A" and "M" registers at the end of the routine, comprise the binary form of 2892 $B_2$.

During routine 2, the output of "A" register 58, comprising a close approximation of 2892 $B_2$, is coupled into "M" register 62, and during routine 3 the contents of the "A" and "M" registers are again multiplied, whereupon AM equals 2892 $B_2^2$, one of the terms of Equation 3.

During routine 4 the output of "A" register 58, closely approximating 2892 $B_2^2$, is shifted into temporary storage register 40, the coefficient 1202 is shifted into "M" register 62, and a value of $T_2$ is shifted into "A" shift register 58.

During routines 5 and 6, the term 1202 $T_2$ of Equation 3 is calculated, and added to the previously derived term, 2892 $B_2^2$.

In like manner, routines 7–29 successively calculate the remainder of Equation 3, the output of "A" register 58 at the conclusion of the sequence comprising the sound velocity $C_2$ of the selected position.

By providing storage 66 with an alternative sequence of routines, DSVC 22 may calculate $C_2$ according to an alternative function of conductivity, termperature, and depth.

Obviously, many modifications and variations of the present invention are possible in the light of the above teachings, and, it is therefore understood the invention may be practiced otherwise than as specifically described.

What is claimed is:

1. Apparatus for providing a profile of the velocity of sound in a liquid media comprising:

means for passively sensing the variables temperature, conductivity and depth at different levels in said media;

means for representing each of said sensed variables in the form of digital numbers;

digital calculating means receiving said variables in their respective digital forms for providing digital outputs which represent the sound velocity in said liquid media at each of said levels;

storage means included in said digital calculating means for storing a plurality of predetermined coefficients and a plurality of predetermined constants;

multiplication means included in said digital calculating means for sequentially forming a plurality of terms, each of said terms including the product of one of said received variables and one of said coefficients;

addition means included in said digital calculating means for adding one of said terms and one of said constants, and for forming one of said digital outputs by adding all of said terms and at least one of said constants and;

recording means coupled to said digital calculating means for making a real-time record of the sound velocity and depth at each of said levels.

2. The apparatus of claim 1 wherein said digital calculating means further includes:

a means for controlling the sequence in which said terms are formed by said multiplication means and in which said terms and said constants are added by said addition means;

a variable selector means coupled to said control means for coupling said received variables to said multiplication means and to said adding means during said sequence.

3. The apparatus of claim 2 wherein:

said storage means comprises interconnected programmable read-only memories which are structured to store the coefficients 2892, 1202, 1316, 3687, 233, and 3190, and constants 2418 and −930.

4. The apparatus of claim 3 wherein:

said multiplication means includes two interconnected 12-bit shift registers;

said addition means includes a 12-bit adder and;

said control means includes at least one programmable read-only memory.

5. The apparatus of claim 1 wherein:

said liquid media comprises an ocean body.

6. The apparatus of claim 1 wherein said recording means includes:

a digital tape recorder for recording said digital outputs and said sensed variables and;

a strip chart recorder for providing a graphic representation in real time of the sound velocity and depth of said liquid at each of said levels.

7. The apparatus of claim 1 wherein:

said recording means makes a record of the sound velocity and depth at two different levels within 84 milliseconds.

* * * * *